US009703101B2

(12) United States Patent
de Matos Peteira Vieira et al.

(10) Patent No.: US 9,703,101 B2
(45) Date of Patent: Jul. 11, 2017

(54) SEE-THROUGH HEAD OR HELMET MOUNTED DISPLAY DEVICE

(71) Applicant: Lusospace, Projectos Engenharia LDA, Lisbon (PT)

(72) Inventors: Ivo Yves de Matos Peteira Vieira, Lisbon (PT); Paulo Romeu Seabra Gordo, Almada (PT); Alexandre Pereira Cabral, Lisbon (PT); Manuel Adler Sanchez de Abreu, Colares (PT)

(73) Assignee: Lusospace, Projectos Engenharia LDA (PT)

( * ) Notice: Subject to any disclaimer, the term of this patent is extended or adjusted under 35 U.S.C. 154(b) by 160 days.

(21) Appl. No.: 14/437,944

(22) PCT Filed: Oct. 23, 2012

(86) PCT No.: PCT/EP2012/004429

§ 371 (c)(1),
(2) Date: Apr. 23, 2015

(87) PCT Pub. No.: WO2014/063716

PCT Pub. Date: May 1, 2014

(65) Prior Publication Data

US 2015/0293358 A1    Oct. 15, 2015

(51) Int. Cl.
*G02B 27/01*    (2006.01)
*G02B 27/00*    (2006.01)
(Continued)

(52) U.S. Cl.
CPC ......... *G02B 27/0172* (2013.01); *G02B 5/201* (2013.01); *G02B 5/32* (2013.01);
(Continued)

(58) Field of Classification Search
CPC .............. G02B 27/017; G02B 27/0172; G02B 27/0174; G02B 27/0176; G02B 27/01;
(Continued)

(56) References Cited

U.S. PATENT DOCUMENTS

| 4,181,405 A | 1/1980 | Cohen |
| 5,210,624 A * | 5/1993 | Matsumoto ........ G02B 27/0101 359/13 |

(Continued)

FOREIGN PATENT DOCUMENTS

| EP | 1942364 A1 | 7/2008 |
| EP | 2447758 A1 | 5/2012 |

(Continued)

OTHER PUBLICATIONS

PCT International Search Report for PCT/EP2012/004429 mailed Jul. 2, 2013.
PCT International Report on Patentability for PCT/EP2012/004429 mailed Apr. 25, 2014.

*Primary Examiner* — Bumsuk Won
*Assistant Examiner* — Ephrem Mebrahtu
(74) *Attorney, Agent, or Firm* — Robert R. Deleault, Esq.; Mesmer & Deleault, PLLC

(57) ABSTRACT

A see-through head or helmet mounted display device (10) comprises a see-through member (18) having a see-through area (22). The see-through member (18) includes a plurality of display segments (20; 20*a*, 20*b*) for emitting visible light. The plurality of display segments (20; 20*a*, 20*b*) is provided within the see-through area (22) in a mutually spaced manner such that the see-through area (22) includes a see-through zone (24) between each pair of adjacent display segments (20; 20*a*, 20*b*). The see-through zone (24) allows visible light to pass through the see-through member (18). The see-through member (18) further includes a plurality of holographic optical elements (26; 26*a*, 26*b*) provided within
(Continued)

Figure 1:
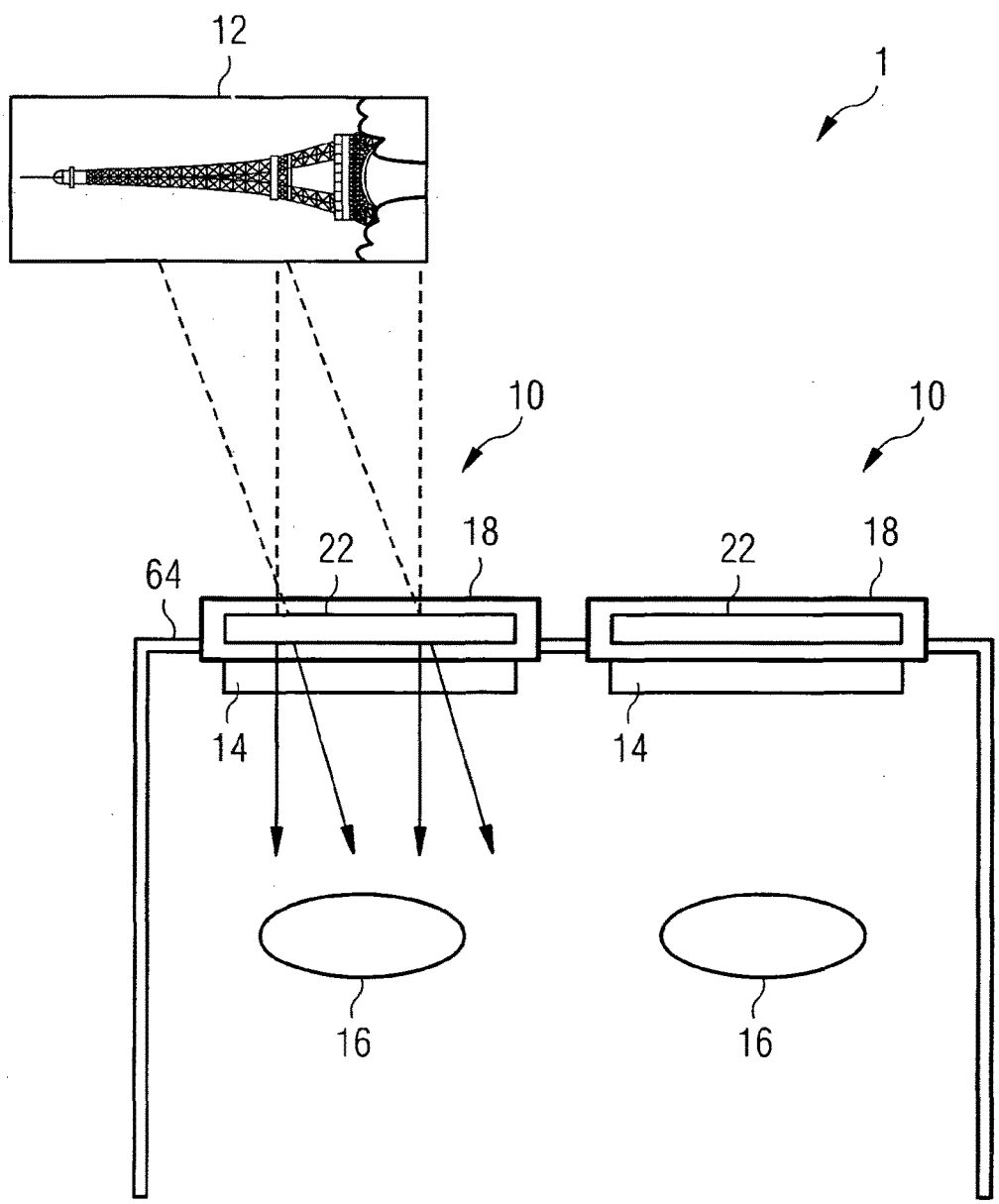

the see-through area (22). Each holographic optical element (26; 26a, 26b) is associated with a respective display segment (20; 20a, 20b). Each display segment (20; 20a, 20b) is located in a focal plane of the associated holographic optical element (26; 26a, 26b) and each holographic optical element (26; 26a, 26b) is adapted to collimate the visible light emitted by the associated display segment (20; 20a, 20b).

18 Claims, 12 Drawing Sheets

(51) Int. Cl.
  *G02B 5/20* (2006.01)
  *G02B 5/32* (2006.01)
  *G02B 27/30* (2006.01)

(52) U.S. Cl.
  CPC ..... *G02B 27/0093* (2013.01); *G02B 27/0176* (2013.01); *G02B 27/30* (2013.01); *G02B 2027/0112* (2013.01); *G02B 2027/0174* (2013.01)

(58) Field of Classification Search
  CPC ............ G02B 27/0101; G02B 27/0103; G02B 27/0105; G02B 27/0149; G02B 2027/0159; G02B 2027/0161; G02B 2027/0163; G02B 2027/0165; G02B 23/125; H04N 13/04; H04N 13/0429; H04N 13/044; A42B 3/042; A42B 3/22; A42B 3/228

USPC .......... 359/630–640, 1–35; 345/1.1–3.4, 7–9, 345/32, 33, 55, 82, 83, 84; 348/40, 41; 2/410, 6.3–6.8, 15, 12, 13, 426–454
  See application file for complete search history.

(56) References Cited

U.S. PATENT DOCUMENTS

| | | | |
|---|---|---|---|
| 5,589,956 A | 12/1996 | Morishima et al. | |
| 2004/0108971 A1* | 6/2004 | Waldern | G02B 27/0093 345/8 |
| 2006/0001977 A1* | 1/2006 | Shimizu | G02B 27/0103 359/630 |
| 2006/0227067 A1 | 10/2006 | Iwasaki | |
| 2007/0291355 A1* | 12/2007 | Tanijiri | G02B 27/0172 359/467 |
| 2007/0297750 A1* | 12/2007 | Bass | G02B 27/017 385/147 |
| 2008/0151185 A1* | 6/2008 | Saito | G02B 27/0101 351/206 |
| 2009/0168131 A1* | 7/2009 | Yamaguchi | G02B 27/017 359/13 |
| 2011/0019258 A1* | 1/2011 | Levola | G02B 6/0035 359/238 |

FOREIGN PATENT DOCUMENTS

| | | |
|---|---|---|
| FR | 2722582 A1 | 1/1996 |
| WO | 97/35223 | 9/1997 |

* cited by examiner

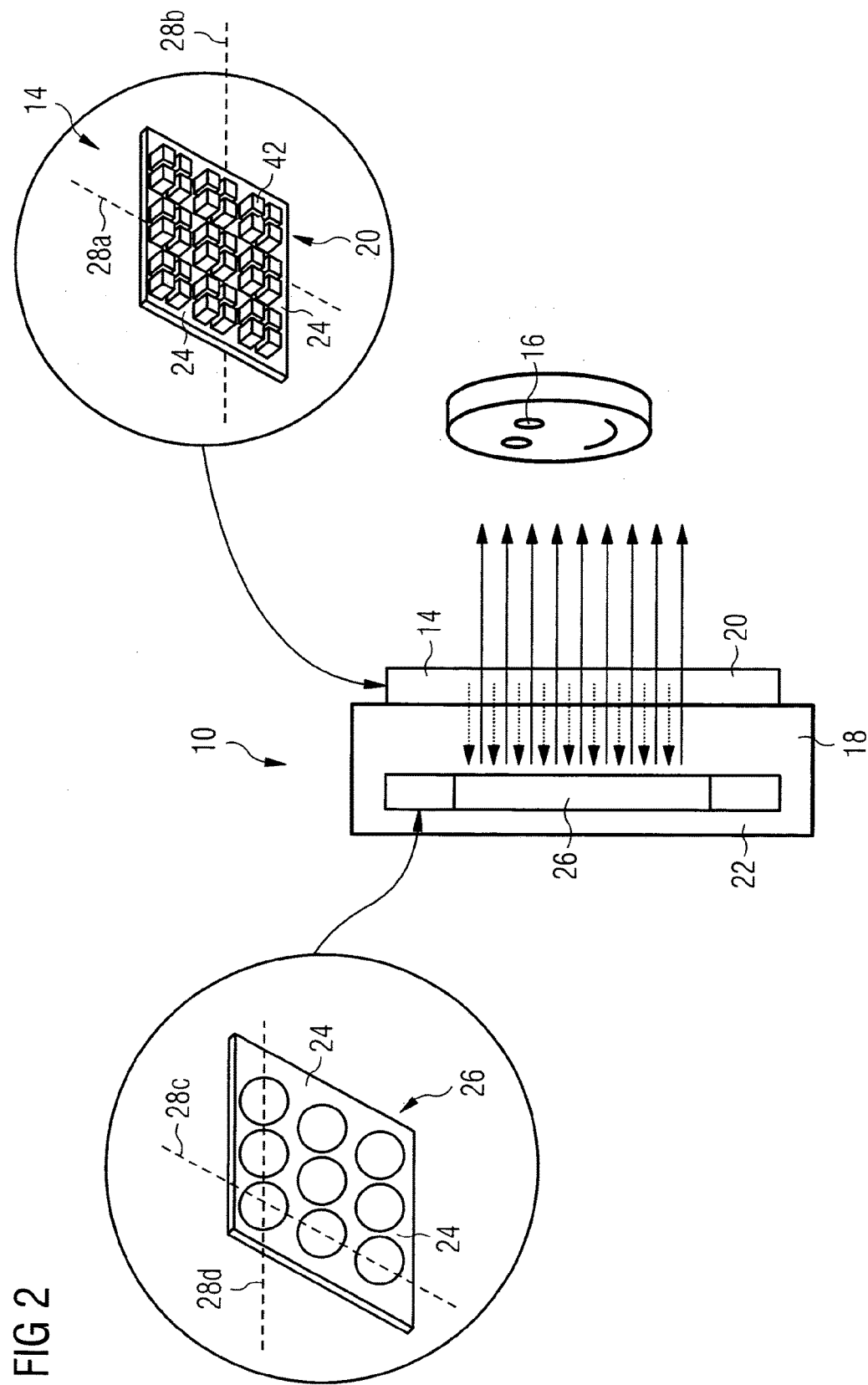

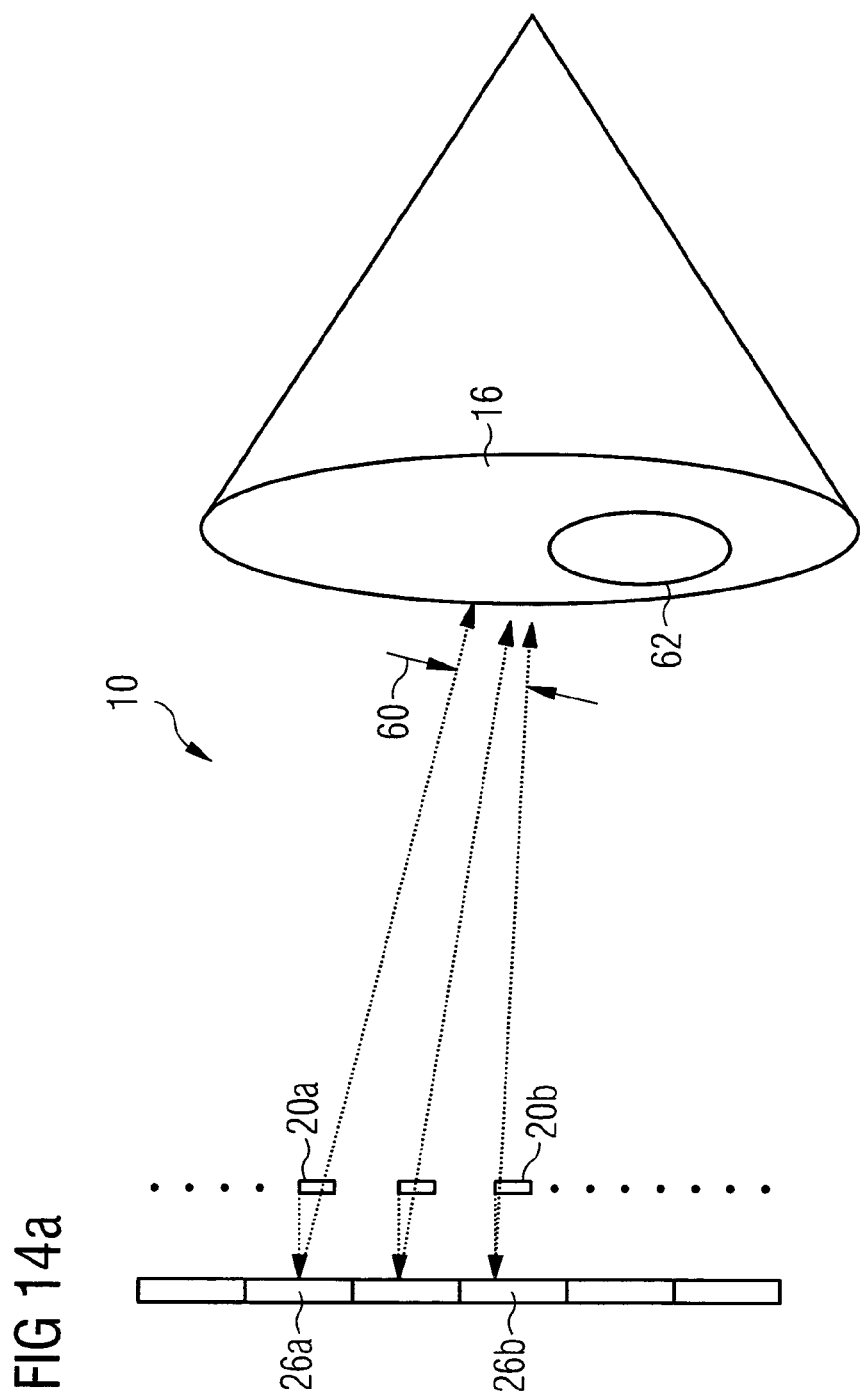

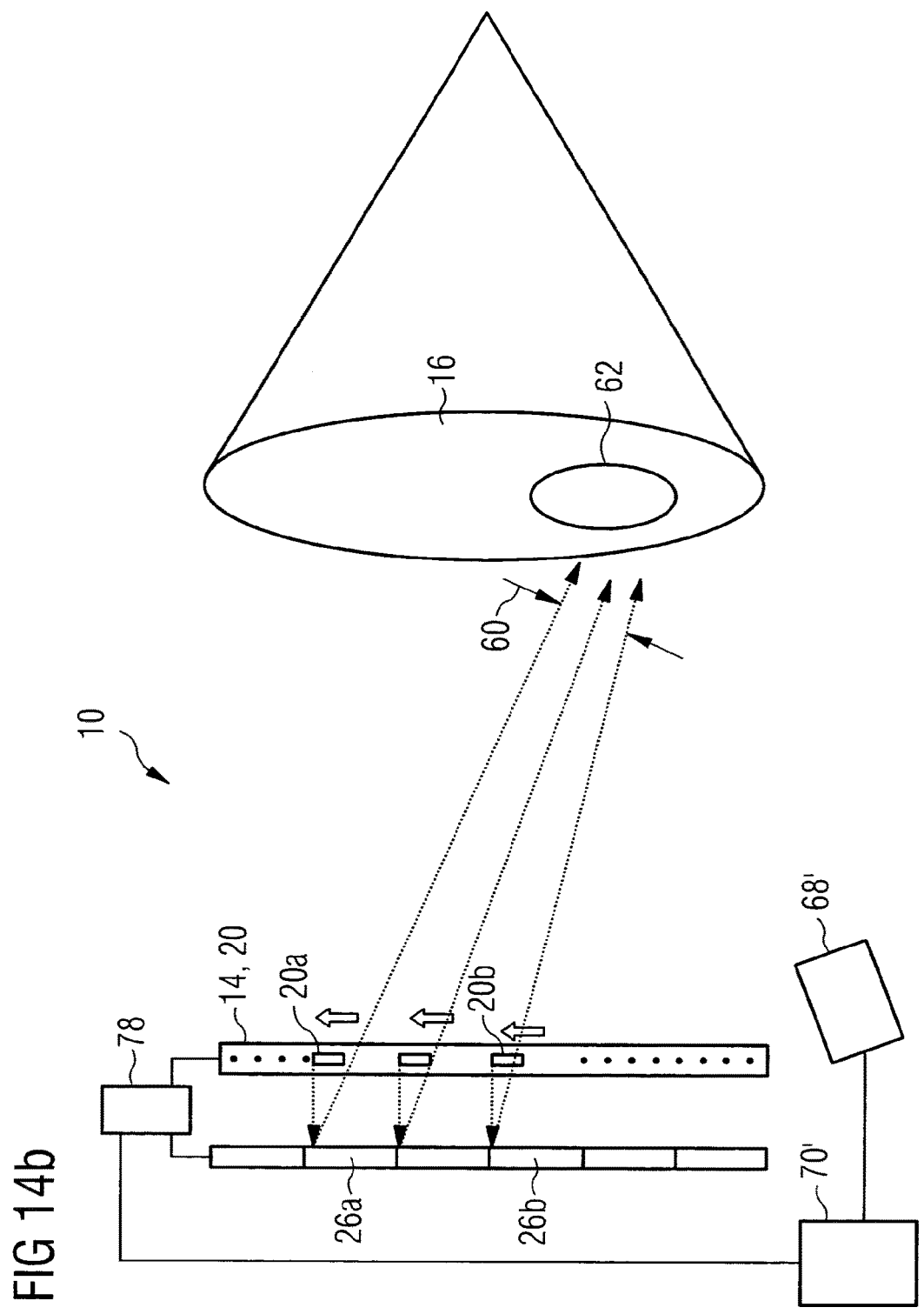

SEE-THROUGH HEAD OR HELMET MOUNTED DISPLAY DEVICE

The present invention relates to a see-through head or helmet mounted display device and a see-through head or helmet display system.

See-through head or helmet mounted display devices are used for creating an augmented reality vision, i.e. for superimposing images of both a physical world and to of a display in a user's view. During the proper use of a see-through head or helmet mounted display device, it is thus possible that beside an image of the physical world passing through a see-through member of the head or helmet mounted display device an additional superimposed image of the display representing overlay information reaches the user's eye(s).

To allow the user accommodating his/her vision to both the superimposed images, a collimating optical system of the see-through head or helmet mounted display device is adapted to magnify the image of the display and to (virtually) project it to infinity. In other words: The image of the display of the see-through head or helmet mounted display device is represented by collimated visible light leaving the see-through head or helmet mounted display device in the direction of the user's eye(s), where it is focused by the human lens, which is accommodated to infinity, on the retina. In this sense, it is understood that collimating visible light emitted by the display means creating an image of the display at infinite distance.

In commonly known see-through head or helmet mounted display devices, the display is decoupled from the see-through member of the see-through head or helmet mounted display device. This design is necessary, because the displays in commonly known see-through head or helmet mounted display devices are not transparent for visible light. Thus the display has to be removed out of the line of sight or out of the field of view of the user using the see-through head or helmet mounted display device.

A problem of this approach, however, is that the visible light representing the image of the display, before being collimated into the user's eye by the collimating optical system, has to be conveyed into the line of sight or the field of view of the user by an additional conveying optical system. This additional conveying optical system, in turn, increases the weight and the size of the see-through head or helmet mounted display device.

It is an object of embodiments of the present invention to provide a see-through head or helmet mounted display device of a lightweight and compact design.

This object is solved by a see-through head or helmet mounted display device according to claim 1.

The see-through head or helmet mounted display device comprises a see-through member having a see-through area. The see-through member includes a plurality of display segments. Each display segment is adapted to emit visible light. The plurality of display segments is provided within the see-through area in a mutually spaced manner such that the see-through area includes a see-through zone between each pair of adjacent display segments. The see-through zone allows visible light to pass through the see-through member. The see-through member further includes a plurality of holographic optical elements provided within the see-through area. Each holographic optical element is associated with a respective display segment, wherein each display segment is located in a focal plane of the associated holographic optical element and each holographic optical element is adapted to collimate the visible light emitted by the associated display segment.

As a consequence of the see-through zone between each pair of adjacent display segments allowing visible light to pass through the see-through member, visible light can pass between each pair of adjacent display segments via the see-through zone. As the plurality of the display segments form the display of the see-through head or helmet mounted display device, both visible light emitted by the display itself and visible light from the physical world can pass through the display. Hence, the display is transparent or at least semi-transparent. Therefore, it is possible to provide the display directly in the line of sight or in the field of view of the user, who uses the see-through head or helmet mounted display device. Only the plurality of holographic optical elements representing the collimating optical system of the see-through head or helmet mounted display device is mandatory, however, an additional conveying optical system for conveying visible light emitted by the display into the line of sight or the field of view is dispensable. This, in turn, allows a lightweight and compact design of the inventive see-through head or helmet mounted display device.

A further advantage of the inventive see-through head or helmet mounted display device results from the use of holographic optical elements. As being a hologram, a holographic optical element may be recorded directly on or in the see-through member, which is part of a see-through head or helmet mounted display device anyways. Thus, a use of real (micro-) lenses or (micro-) mirrors made of, for example, relatively heavy glass or plastic is not necessary. This allows to further decrease the weight and the size of the inventive see-through head or helmet mounted display device.

Another advantage of the inventive see-through head or helmet mounted display device arises from the use of a plurality of holographic optical elements: When using a single optical element instead of a plurality of holographic optical elements to collimate the visible light emitted by the display, the f-number of the single optical element (being defined as a ratio of a focal length of the single optical element divided by a size of an entrance pupil of the single optical element, where the size of the entrance pupil is defined by the distance between the two points on the profile of the entrance pupil farthest apart) has to be small, which leads to serious aberrations in the image of the display. In contrast to this, by employing a plurality of (relatively small) holographic optical elements instead of a (relatively large) single optical element (so to say: by dividing the single optical element into a plurality of holographic optical elements) and by associating each holographic optical element with one respective display segment, the f-number of each holographic optical element can be kept large. This allows an aberration free imaging of the display formed by the display segments.

The see-through member represents, for example, a substrate, a viewing port, a window, a visor, a glass, an eyepiece, an eyeglass, a corrective lens and/or a spectacle lens of the see-through head or helmet mounted display device. The see-through member may be made of glass or plastic. The see-through area, for example, is a part, a section, a region or an area of the see-through member, through which a user views through the see-through member during a proper use of the see-through head or helmet mounted display device. The see-through area and/or the see-through zone may be transparent and/or translucent for the whole visible light spectrum. In other words: Visible light may pass through the see-through area and/or the see-through zone without being scattered, reflected, refracted, deflected and/or absorbed.

The plurality of display segments can be arranged upon or inside the see-through member and/or the see-through area. For example, arranging the plurality of display segments inside the see-through member allows for a protection of the display segments against physical impact such as scratching. The arrangement of the plurality of display segments may be realized by fixing, gluing, bonding, welding, or printing as a circuit.

The see-through area of the see-through member may include the see-through zone also between each pair of adjacent holographic optical elements. The holographic optical elements may thus be mutually spaced. This allows visible light passing through the see-through member between the holographic optical elements via the see-through zone.

The plurality of display segments and/or the plurality of holographic optical elements may be provided in a rhombus-shaped, rectangular-shaped, or square-shaped manner across a respective two-dimensional array. The array may lie in a plane or curved arrangement area. The arrangement area may be imaginary or a surface of the see-through member. This allows a dense arrangement of the display segments and/or the holographic optical elements, while the display segments and/or the holographic optical elements can be still kept mutually spaced. Hence, the display can have a high resolution even though being transparent or at least semi-transparent.

A number of the plurality of display segments and/or a number of the plurality of holographic optical elements along one dimension of the two-dimensional array may be, for example, 5, 10, 50, or 200, or in a range of 5 to 10, 5 to 50, or 5 to 200. Additionally or alternatively, a number of the plurality of display segments and/or a number of the plurality of holographic optical elements in the two-dimensional array may be, for example, 25, 100, 2500, or 40000, or in a range of 25 to 100, 25 to 2500, or 25 to 40000. A large number of display segments, for example, has the advantage to increase the display size. As a consequence, the field of view of the see-through head or helmet mounted display device is large as well.

A separation distance between centers of adjacent display segments and/or a separation distance between centers of adjacent holographic optical elements may be, for example, 28 µm, 112 µm, 560 µm, or 1120 µm, or in a range of 28 µm to 112 µm, 28 µm to 560 µm, or 28 µm to 1120 µm.

A size of the display being formed by the plurality of display segments in a see-through head or helmet mounted display device may be defined as the maximum separation distance between the centers of two display segments of the display, i.e. the separation distance between the two display segments farthest apart in the display. Similarly, a size of the collimating optical system formed by the plurality of holographic optical elements in a see-through head or helmet mounted display device may be defined as the maximum separation distance between the centers of two display segments of the collimating optical system. A maximum separation distance between centers of two display segments of the display and/or a maximum separation distance between centers of two holographic optical elements of the plurality of holographic optical elements may be, for example, around 5, 6 mm or around 8 mm, or in a range of 4 mm to 12 mm.

A holographic optical element may be recorded in an emergent holographic emulsions provided within the see-through area, in particular, on or in the see-through member. A holographic optical element may have magnifying optical properties such that a (virtual) image of the associated display segment is provided in infinity (i.e. at infinite distance). Such a holographic optical element allows a simple realization of a holographic optical element having a focal plane and being adapted to collimate visible light emitted by a display segment located in the focal plane of the holographic optical element.

In particular, a holographic optical element may be a holographic converging lens (i.e. a transmission hologram of a converging lens). Such a holographic optical element allows arranging the display segment associated with the holographic optical element on a side of the holographic optical element facing away from an eye of a user, who views properly through the see-through head or helmet display device. Such an arrangement of the holographic optical element and the corresponding display segment relative to the eye of the user has the advantage that a mask (as described below) is dispensable. The holographic optical element may have rotationally symmetric imaging properties, for example, by being the transmission hologram of a rotationally symmetric, spherical and/or aspherical converging lens.

Alternatively, a holographic optical element may be a holographic concave mirror (i.e. a reflection hologram of concave mirror). In particular, the holographic concave mirror is a reflective, concave and parabolic mirror (i.e. a reflection hologram of a reflective, concave, and parabolic mirror). Such a holographic optical element allows arranging the display segment associated with the holographic optical element on a side of the holographic optical element facing towards an eye of a user, who views properly through the see-through head or helmet display device. The holographic optical element may have rotationally symmetric imaging properties, for example, by being the reflection hologram of a rotationally symmetric, concave, parabolic mirror.

A holographic optical element may be adapted to deflect (i.e. reflect or refract) visible light only within a deflection spectrum and to be transparent for visible light within a transmission spectrum, wherein the deflection spectrum and the transmission spectrum are spectrally disjoint. In other words: Each of the deflection spectrum and the transmission spectrum only cover a respective spectral section of the visible light spectrum and the deflection spectrum and the transmission spectrum do not overlap. This can be realized by holographically recording the holographic optical element using visible light only within the deflection spectrum. Such a holographic optical element is only refractive or reflective for visible light within deflection spectrum. Visible light within the transmission spectrum, in turn, passes through the holographic optical element without being refracted, reflected and/or absorbed by holographic optical element. Visible light representing an image of the physical world outside the see-through head or helmet mounted display device is thus not or only slightly affected by the presence of the holographic optical element.

In particular, a holographic optical element may be adapted such that the deflection spectrum consists of a band spectrum. The band spectrum may include a red color. The wavelength of the red color may be, for example, around 630 nm. However, any other color is conceivable, such as green or blue. A bandwidth of the band spectrum may be limited, for example, to around 30 nm. Such holographic optical element only refracts or reflects visible light of a single color. Visible light of other colors passes through the holographic optical element unaffected. Simultaneously, such a holographic optical element allows collimating visible light within the deflection spectrum emitted by the display segment associated with the holographic optical element for creating a mono-chromatic image of the display segment at infinite distance.

Additionally or alternatively, a holographic optical element may be adapted such that the deflection spectrum includes plurality of band spectra (i.e. two, three, four, or more band spectra). In particular, a holographic optical element may be adapted such that the deflection spectrum includes a first band spectrum, a second band spectrum and third band spectrum. The first band spectrum may include a red color, the second band spectrum may include a green color and/or the third band spectrum may include a blue color. The band spectra, in particular, the first, the second and the third band spectrum may be spectrally disjoint and mutually separated by the transmission spectrum of the holographic optical element. A bandwidth of one of the band spectra, in particular, a bandwidth of the first, the second and/or the third band spectrum may be limited, for example, to around 30 nm. As a consequence, the deflection spectrum of the holographic optical element may consist of narrow band spectra, wherein each band spectrum only refracts or reflects visible light of a single color. Visible light of colors not within the deflection spectrum, i.e. visible light of colors within the transmission spectrum, passes through the holographic optical element unaffected. Simultaneously, such a holographic optical element allows collimating visible light within the deflection spectrum emitted by the display segment associated with the holographic optical element for creating a multi-chromatic image of the display segment at infinite distance.

For each holographic optical element a band pass filter may be provided. The band pass filter may be adapted to filter out (i.e. to reject, reflect and/or absorb) visible light only within the deflection spectrum of the holographic optical element and to transmit visible light within the transmission spectrum of the holographic optical element. The band pass filter may be a notch filter, an interference filter, a Fabry-Perot-cavity or the like. In particular, the band pass filter may be provided on a side of the holographic optical element facing away from an eye of a user, who views properly through the see-through head or helmet display device, such that visible light from the physical world within the deflection spectrum of the holographic optical element is prevented from passing through the holographic optical element. This allows that visible light, which represents an image of the physical world and whose color falls within the deflection spectrum of the holographic optical element, does not perturb, disturb or pollute the superimposed image of the display in the eye of the user.

A display segment may be adapted to emit visible light only within an emission spectrum. In particular, the display segment may be adapted such that the emission spectrum includes an emission band spectrum with a limited emission bandwidth. The emission band spectrum may include a red color. The wavelength of the red color may be, for example, around 630 nm. However, any other color is conceivable, such as green or blue. The emission bandwidth of the emission band spectrum may be limited, for example, to around 30 nm or smaller. Such a display segment allows for creating a mono-chromatic image.

Additionally or alternatively, a display segment may be adapted such that the emission spectrum includes a plurality of emission band spectra (i.e. two, three, four, or more band spectra). In particular, a display segment may be adapted such that the emission spectrum includes a first emission band spectrum, a second emission band spectrum and third emission band spectrum. The first emission band spectrum may include a red color, the second emission band spectrum may include a green color and/or the third emission band spectrum may include a blue color. The emission band spectra, in particular, the first, the second and the third emission band spectrum may be spectrally disjoint and mutually separated by a spectral section of to the visible light spectrum. An emission bandwidth of one of the band spectra, in particular, an emission bandwidth of the first, the second and/or the third emission band spectrum may be limited, for example, to around 30 nm or smaller. Such a display segment allows for creating a multi-chromatic image.

In particular, a display segment may be adapted to emit visible light only within a deflection spectrum of the holographic optical element associated with the display segment. In other words: An emission spectrum of the display segment may be completely covered by the deflection spectrum of the associated holographic optical element such that the whole emission spectrum of the display segment is refracted or reflected by the associated holographic optical element. In particular, an emission bandwidth of a first, a second and/or a third emission band spectrum may be as wide as or narrower than a bandwidth of a first, a second and/or a third band spectrum. Thus, all or at least most of the light emitted by the display segment is collimated by the associated holographic optical element. This allows the design of an energy efficient see-through head or helmet display device generating bright display images.

A display segment may include a plurality of pixel units. Thus, the display may be formed of a plurality of mutually spaced display segments, wherein each display segment may be formed of a plurality of pixel units. As a consequence, on a macroscopic scale the display comprises a plurality of display segments, between which visible light can pass through. On a microscopic scale, in turn, each display segment itself may be regarded as a micro-display comprising a plurality of pixels units, wherein between adjacent pixel units not necessarily a see-through zone of the see-through member has to be provided allowing visible light to pass between the adjacent pixel units. This two-scale approach thus allows providing a transparent or at least semi-transparent display with high resolution.

The pixels units within a display segment may be mutually spaced. In particular, the plurality of pixels units of a display segment may be provided in the focal plane of the holographic optical element associated with the display segment. Within the display segment, the plurality of pixel units may be provided in a rhombus-shaped, rectangular-shaped, or square-shaped manner across a respective two-dimensional pixel array. The pixel array may lie in a plane or curved pixel arrangement area. The pixel arrangement area may be imaginary or a surface of the see-through member. The pixel arrangement area may coincide with an arrangement area for arranging the plurality of display segments.

A number of the plurality of pixel units along one dimension of the two-dimensional pixel array may be, for example, 3, 12, 60, or 120, or in a range of 3 to 12, 3 to 60, or 3 to 120. Additionally or alternatively, a number of the plurality of pixel units in the two-dimensional pixel array may be, for example, 9, 144, 3600, or 14400, or in a range of 9 to 144, 9 to 3600, or 9 to 14400.

A separation distance between centers of adjacent pixel units (also called pitch) may be, for example, around 5 µm. A size of a display segment being formed by the plurality of pixel units within the display segment may be defined as the maximum pixel separation distance between the centers of two pixel units of the display segment, i.e. the pixel separation distance between the two pixel units farthest apart in the display segment. A maximum pixel separation distance between centers of two pixel units of a display segment may be, for example, around 15 µm, 21 µm, 60 µm, 85 µm, 300 µm, 424 µm, 600 µm, or 849 µm.

A pixel unit may be adapted to emit visible light. For example, a pixel unit may be an organic light emitting diode (OLED), a micro-laser or a liquid crystal display (LCD) element. Thus, the plurality of pixel units may be employed to realize that the display segment comprising the pixel unit is adapted to emit, for example, visible light only within a specific monochromatic emission spectrum.

Additional or alternatively, a pixel unit of a display segment may comprise three sub-pixel units, wherein the sub-pixel units are adapted to emit visible light of three different colors. For example, a first sub-pixel unit may emit red, a second sub-pixel unit may emit green and/or a third sub-pixel unit may emit blue light. The sub-pixel units may be organic light emitting diodes (OLED), a micro-laser or a liquid crystal display (LCD) element. Thus, the plurality of sub-pixel units may be employed to realize that the display segment comprising the sub-pixel units is adapted to emit visible light only within a specific multi-chromatic emission spectrum.

The sub-pixel units of a display segment may be stacked substantially along a depth of field of the holographic optical element associated with the display segment. This allows a compact design of the see-through head or helmet display device for generating multi-chromatic display images.

A light emission surface of a pixel unit and/or a light emission surface of a sub-pixel unit may be square-shaped or rectangular-shaped. A light emission surface may be, for example, around 25 µm$^2$.

A holographic optical element may deflect visible light only with its deflection region. The deflection region may be the entrance pupil of the holographic optical element. A size of the holographic optical element may be defined as the maximum point separation distance between two points within the deflection region of the holographic optical element, i.e. the point separation distance between the two points farthest apart in the deflection region. The maximum point separation distance of a holographic optical element may be larger than a size of the display segment associated with the holographic optical element. In other words: The entrance pupil of the holographic optical element may be larger than the size of the associated display segment. Additionally or alternatively, the maximum point separation distance of a holographic optical element may be smaller than, for example, 2 mm or 3 mm or the size of a pupil of a human eye.

A display segment may be provided with a mask such that the display segment emits the visible light only towards the holographic optical element associated with the display segment. The mask may comprise material opaque or reflective for the visible light emitted by the display segment. The mask may surround all the sides of the display segment despite the one side of the display segment that faces towards the associated holographic optical element.

The holographic optical elements and the associated display segments may be adapted and/or arranged such that an inclination angle between a propagation direction of visible light collimated by a holographic optical element associated with a display segment displaced by a displacement distance from a center of the plurality of display segments and a propagation direction of visible light collimated by a holographic optical element associated with a display segment located at the center of the plurality of display segments increases with increasing displacement distance in such a manner that the visible light collimated by each holographic optical element passes through an exit pupil of the see-through head or helmet mounted display device. Such an arrangement may be realized as follows: An optical axis of a holographic optical element is by definition oriented perpendicular to the focal plane of the holographic optical element. The orientation of the optical axis can thus be adjusted and fixed during the recording of the holographic optical element by tilting the object (i.e. the lens or the mirror or the like) being imaged as hologram. The orientation of the optical axis of the holographic optical element and the positioning of the associated display segment in the focal plane of the holographic optical element then allow adjusting the inclination angle. The inclination angle may be regarded as half the angle of view (i.e. the angle of the view cone) of the see-through head or helmet display device. As a consequence, the visible light emitted by all the display segments and collimated by the associated holographic optical elements passes through one exit pupil. Hence, all or most of the light power of the display can be collimated into the user's eye leading to low power requirements of the see-through head or helmet mounted display device.

In particular, the holographic optical elements and the associated display segments may be adapted and arranged such that the exit pupil of the see-through head or helmet mounted display device is smaller than, for example, 2 mm or 3 mm. Additionally or alternatively, the holographic optical elements and the associated display segments may be adapted and arranged such that the inclination angle is, for example, 40°/2, 50°/2, or 70°/2, or in a range of 40°/2 to 50°/2, or 40°/2 to 70°/2.

The see-through head or helmet display device may further comprise a frame, an actuator for tilting the plurality of display segments and the plurality of holographic optical elements relative to the frame, an image capturing device for capturing an image of a user's eye and for generating a position signal representing a position of a pupil of the user's eye, and a controller for controlling the actuator based on the position signal such that the position of the exit pupil of the see-through head or helmet mounted display device coincides with the position of the pupil of the user's eye. In other words: All collimated light originating from the display and leaving the see-through head or helmet display device reaches the pupil of the user's eye, even when the pupil of the user's eye is moving.

Additionally or alternatively, the see-through head or helmet display device may comprise a beam expander, which is adapted to expand the visible light collimated by the holographic optical segments. This allows enlarging the profile of collimated beams such that all the beams pass (at least partially) through the pupil of the user's eye.

The beam expander may be provided on a side of the plurality of holographic optical segments facing towards the user's eye and on a side of the plurality of display segments facing towards the user's eye. The beam expander may consist of two holographic optical elements. The size of these holographic optical elements may be larger than the size of the display.

Additionally or alternatively, the see-through head or helmet display device may comprise a shifter for shifting the plurality of display segments relative to the plurality of holographic optical elements along the focal planes of the holographic optical elements, an image capturing device for capturing an image of the pupil and for generating a position signal representing a position of the pupil, and a controller for controlling the shifter based on the position signal such that the position of the exit pupil coincides with the position of the pupil. In other words: The display formed by the display segments is shifted relative to the collimating optical system formed by the plurality of holographic optical elements, thereby shifting each display segment within the focal plane of the corresponding holographic optical element. Hence, all collimated light originating from the display and leaving the see-through head or helmet display device reaches the pupil of the user's eye, even when the pupil of the user's eye is moving.

A see-through head or helmet display system comprises two see-through head or helmet display devices. This allows employing one see-through head or helmet display device for each eye of the user.

Throughout this description, when referring to a feature characterizing an element of a plurality of elements, each of the plurality of elements may be characterized by the corresponding feature.

Figure 3B:
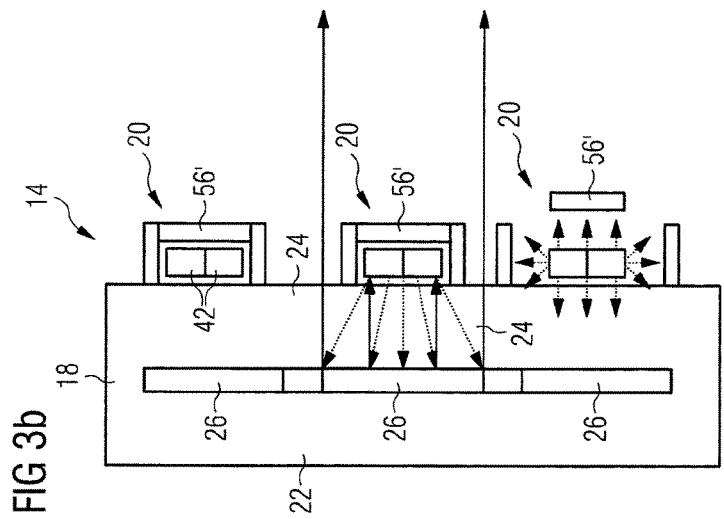
Figure 3A:
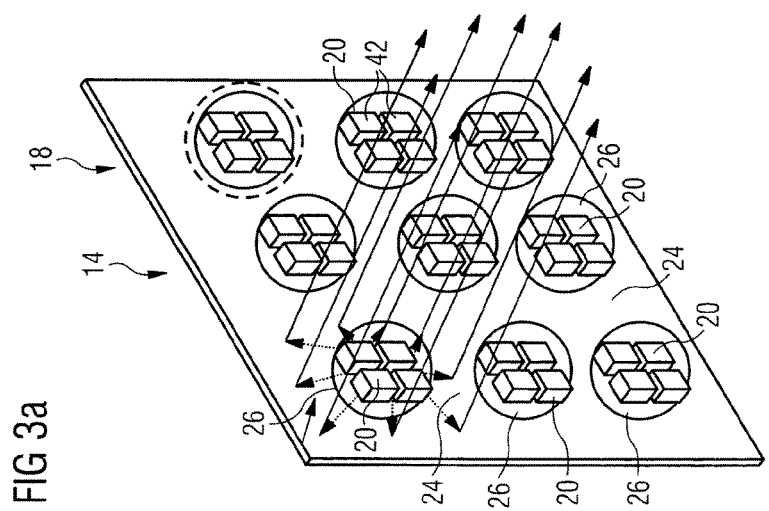
Figure 4C:
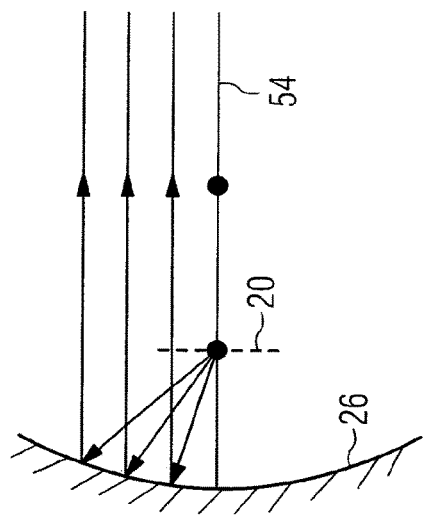
Figure 4B:
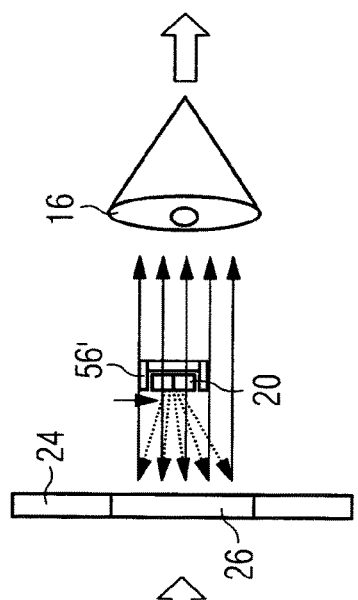
Figure 4A:
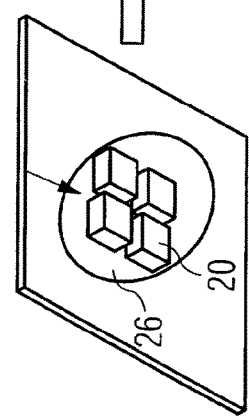
Figure 5:
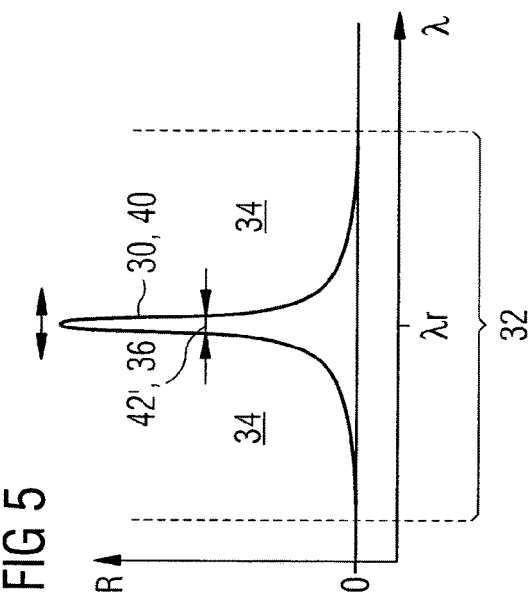
Figure 6:
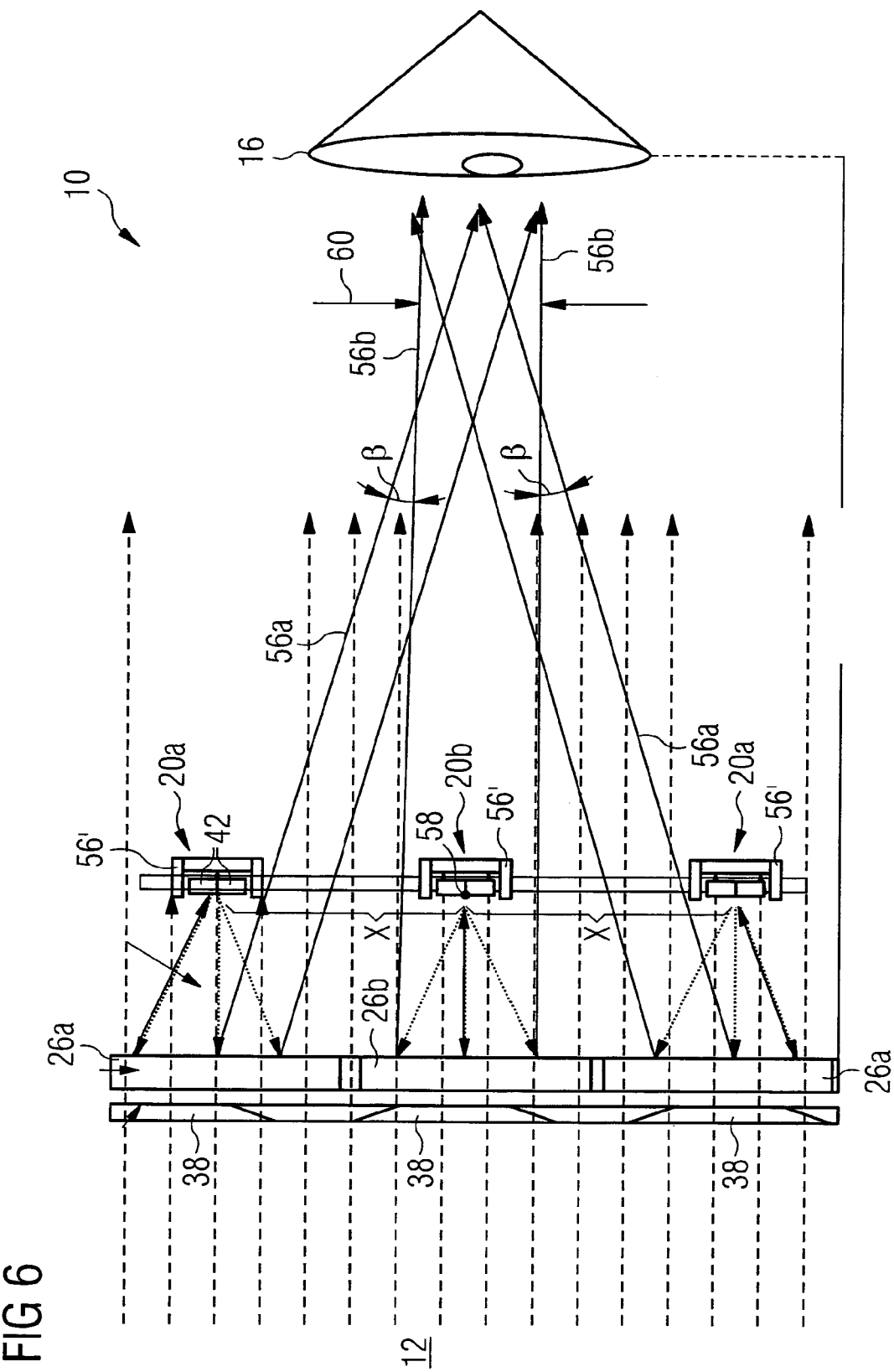
Figure 7:
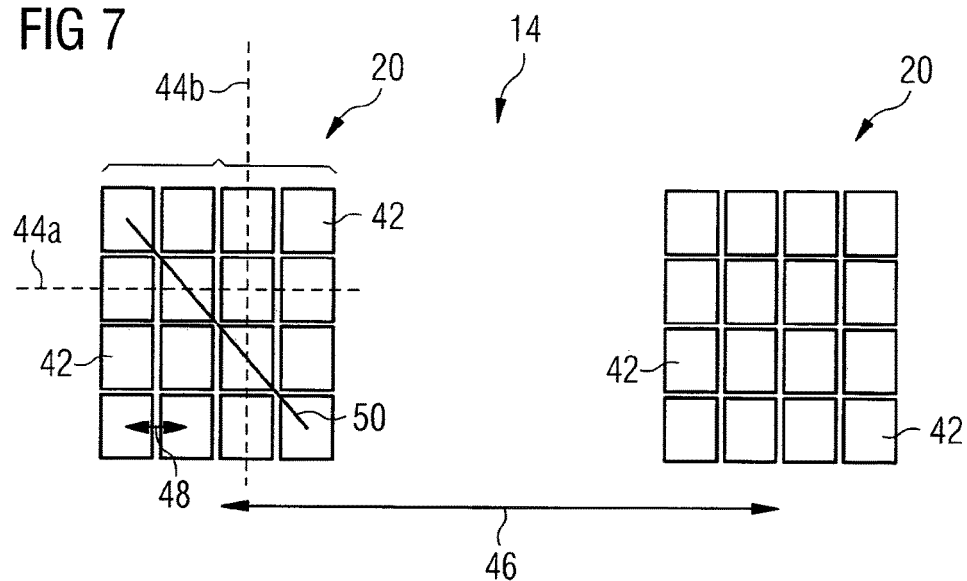
Figure 8:
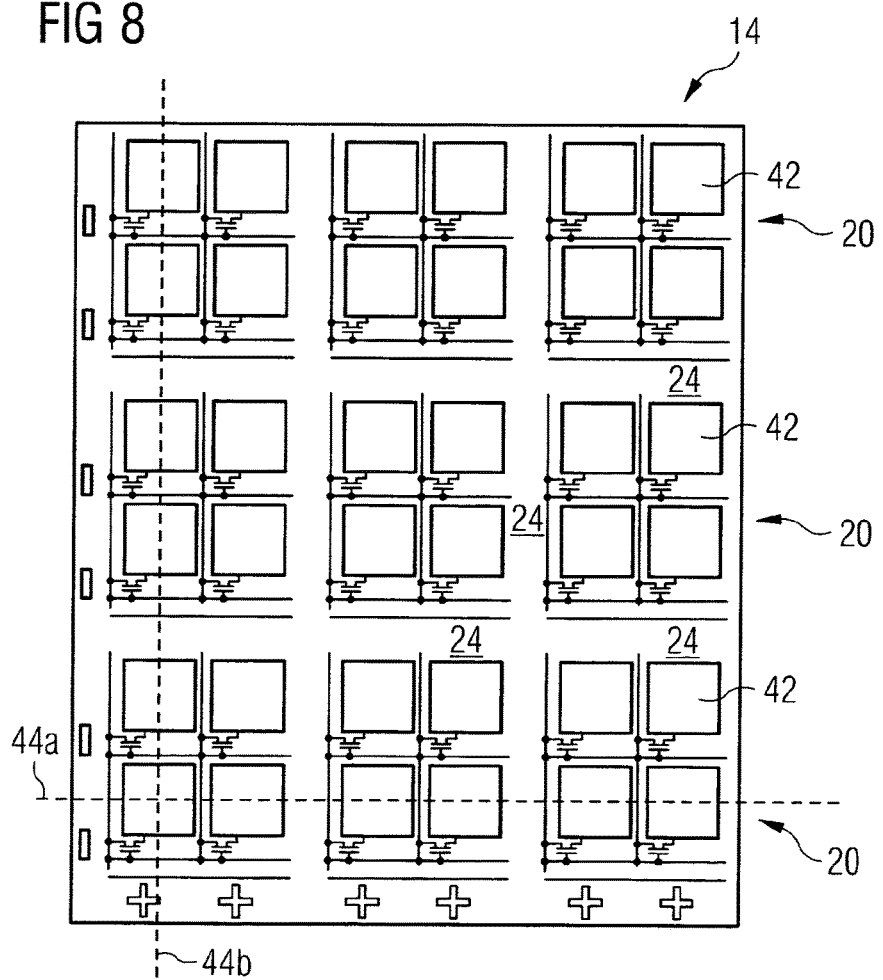
Figure 9:
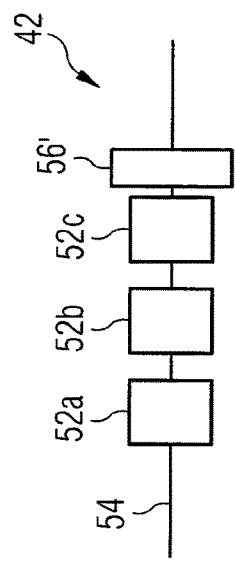
Figure 10:
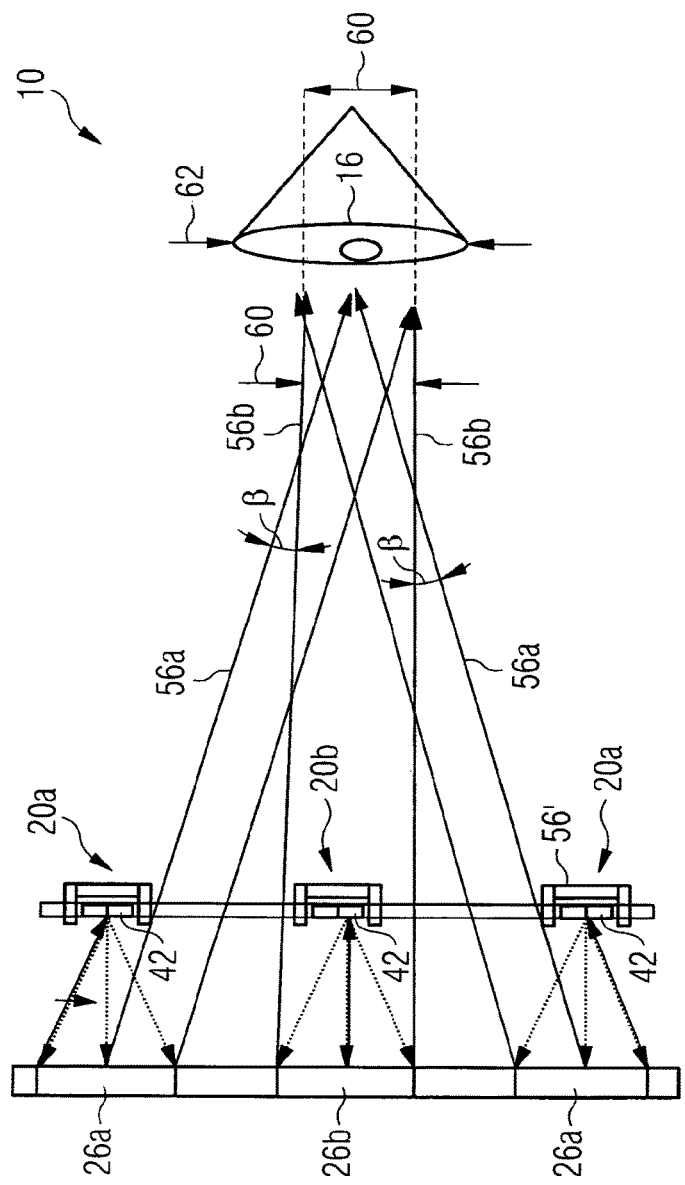
Figure 11:
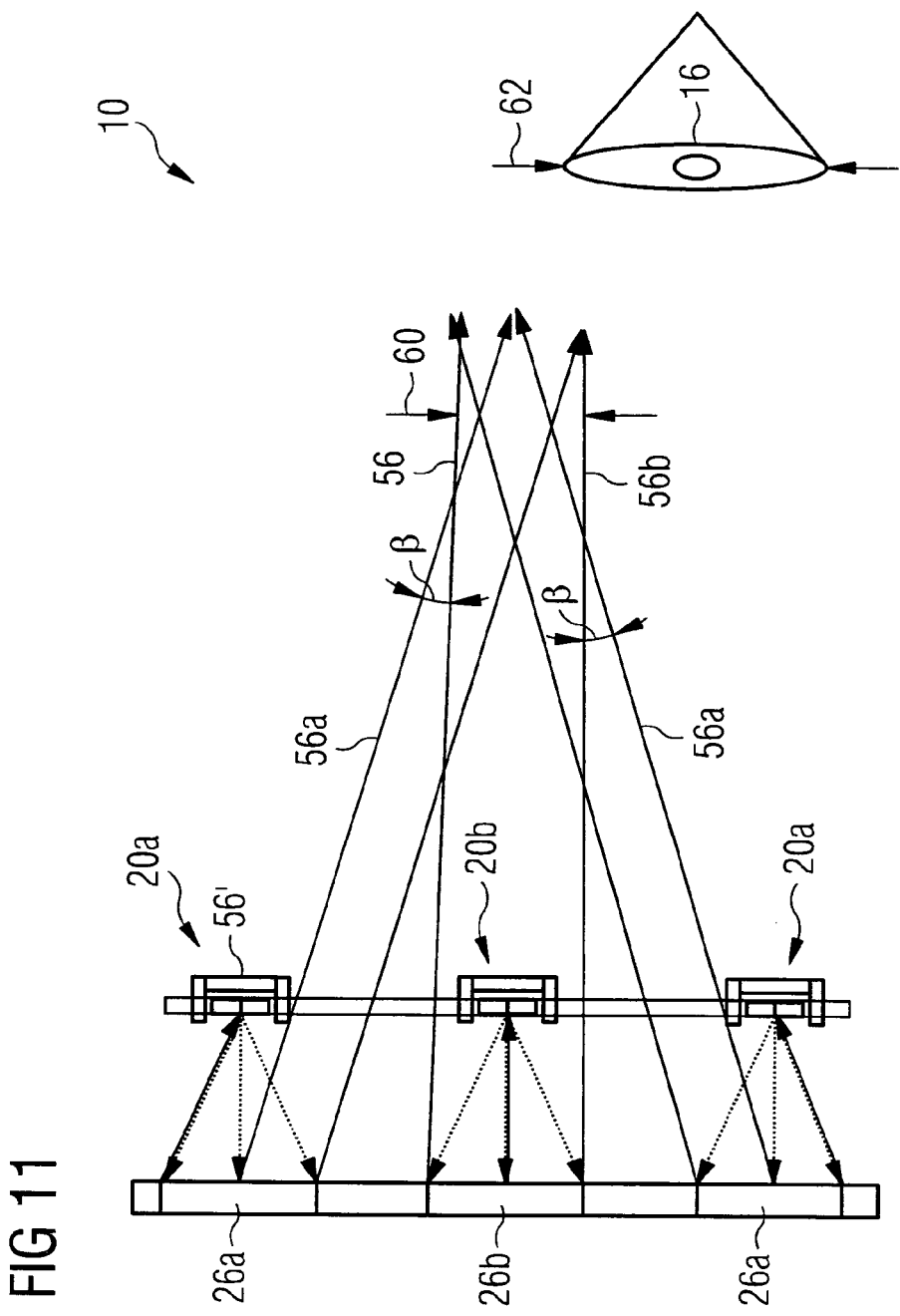
Figure 12:
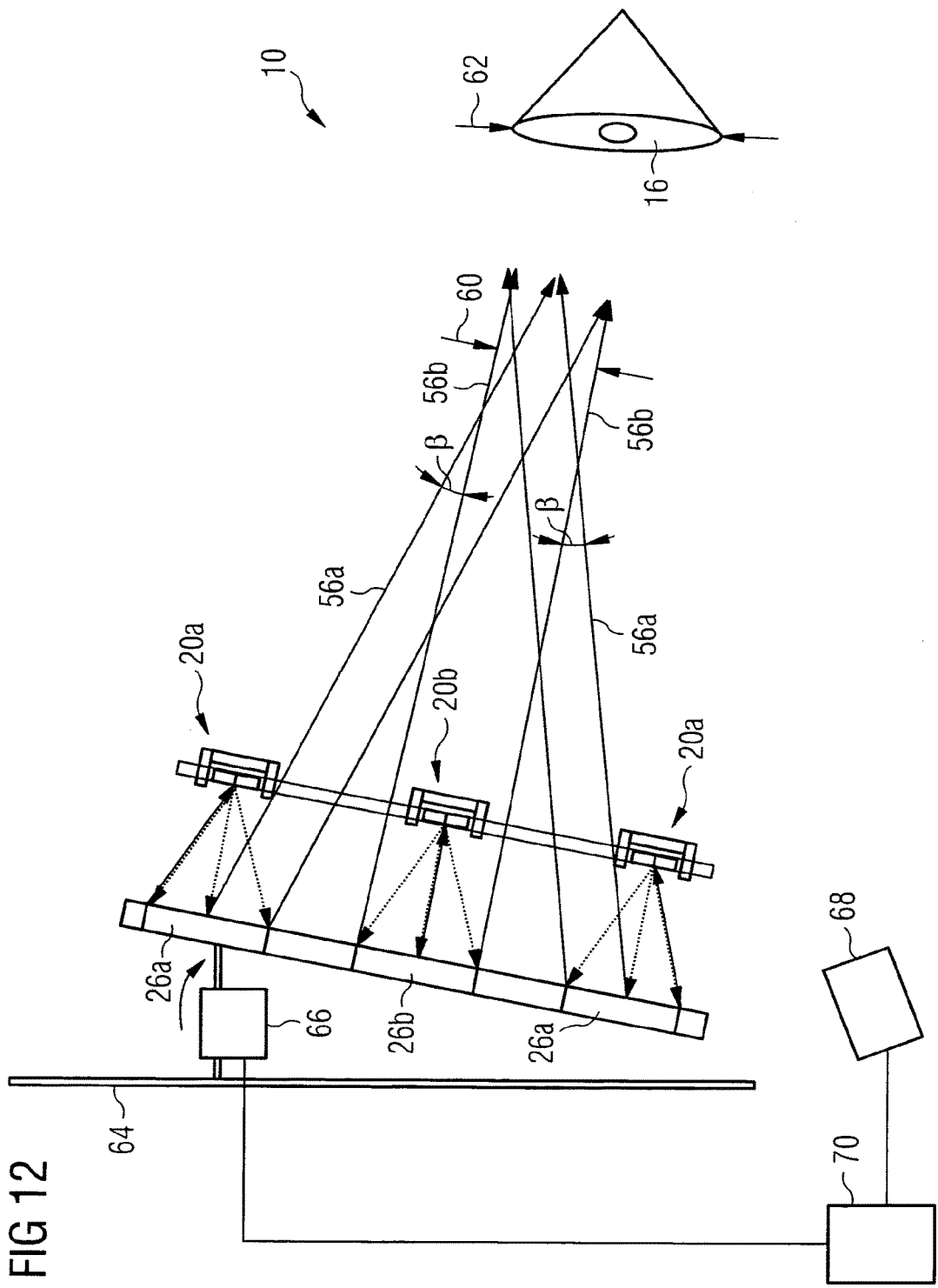
Figure 13:
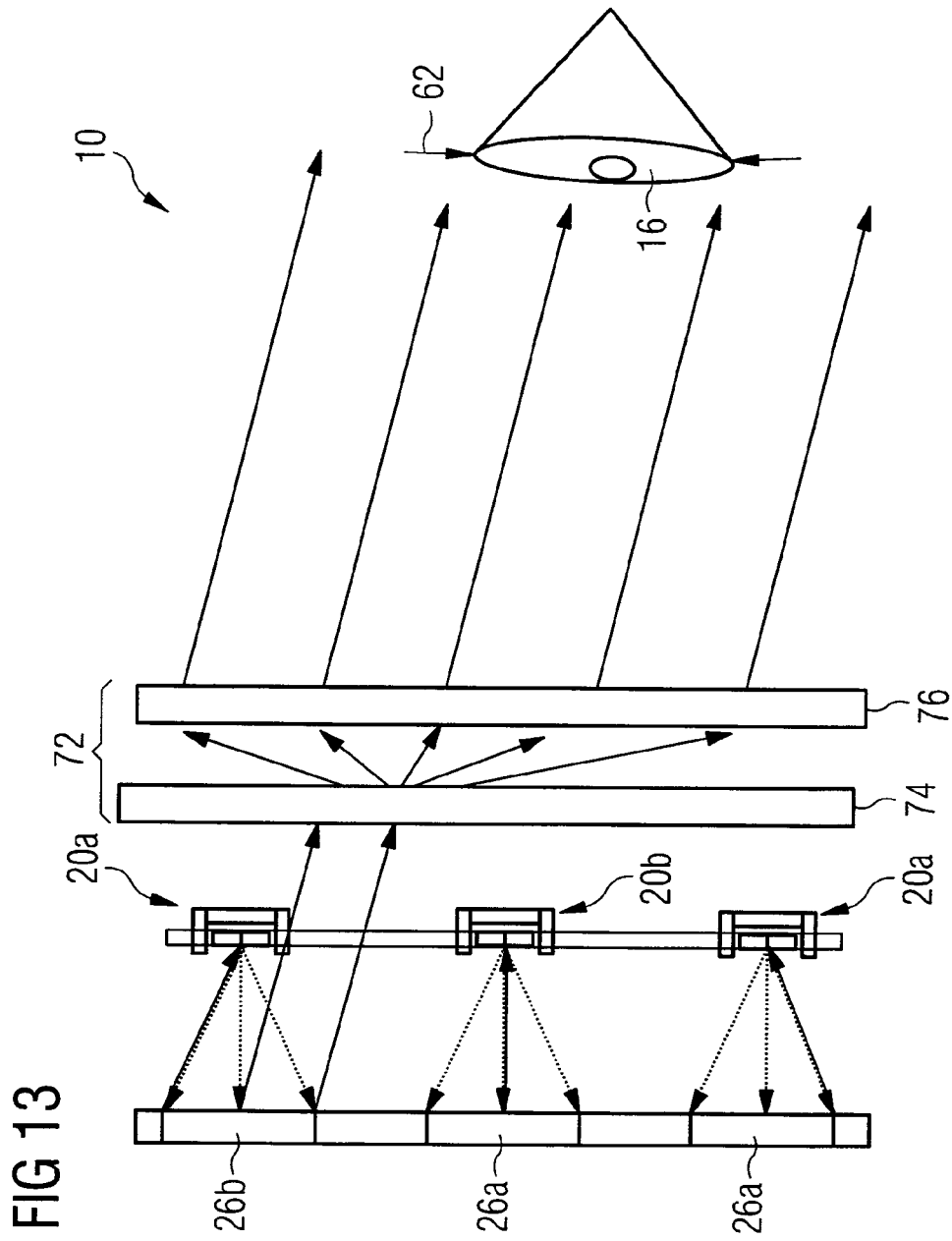

The invention will be elucidated further in the following on the basis of the appended drawings, of which:

FIG. 1 shows schematically, in top view, an example of a see-through head or helmet mounted display system, FIG. 2 shows schematically, at the center in side view, an example of a see-through head or helmet mounted display device, left in three-dimensional view, a plurality of holographic optical elements, and, right in three-dimensional view, a plurality of display segments, FIG. 3*a* shows schematically, in three-dimensional view, the plurality of holographic optical elements and the plurality of display segments from FIG. 2, FIG. 3*b* shows schematically, in side view, the plurality of holographic optical elements and the plurality of display segments from FIG. 2, FIG. 4*a* shows schematically, in three-dimensional view, a display segment and an associated holographic optical element, FIGS. 4*b* and 4*c* show schematically, in side view, the display segment and the holographic optical element from FIG. 4*a*, FIG. 5 shows schematically a deflection spectrum of a holographic optical element and an emission spectrum of an associated display segment, FIG. 6 shows schematically, in side view, another example of a see-through head or helmet mounted display device, FIG. 7 shows schematically, in top view, an example of an array of two display segments, FIG. 8 shows schematically, in top view, an example of an array of nine display segments, FIG. 9 shows schematically, in side view, an example of a pixel unit comprising a stack of sub-pixel units, FIGS. 10 and 11 show schematically, in side view, the see-through head or helmet mounted display device from FIG. 6, FIG. 12 shows schematically, in side view, a modification of the see-through head or helmet mounted display device from FIG. 6, and FIG. 13 shows schematically, in side view, another modification of the see-through head or helmet mounted display device from FIG. 6.

FIGS. 14*a* and 14*b* show schematically, in side view, still another modification of the see-through head or helmet mounted display device from FIG. 6.

The see-through head or helmet mounted display system 1, as shown in FIG. 1, comprises two see-through head or helmet mounted display devices 10, one for each eye 16 of a user. Each see-through head or helmet mounted display device 10 serves for creating an augmented reality vision, i.e. for superimposing images of both a physical world 12 and of a display 14 in a user's eye 16. The display 14 is directly arranged in the line of sight or in the field of view of the user. During the proper use of a see-through head or helmet mounted display device 10, it is thus possible that beside an image of the physical world 12 passing through a see-through member 18 of the head or helmet mounted display device 10 an additional superimposed image of the display 14 reaches the user's eye(s) 16.

As shown in FIGS. 2, 3*a* and 3*b*, the see-through member 18 includes a plurality of display segments 20 for emitting visible light. The display segments 20 are provided within a see-through area 22 of see-through member 18 in a mutually spaced manner such that the see-through area 22 includes a see-through zone 24 between each pair of adjacent display segments 20, see FIGS. 3*a* and 3*b*. The see-through member 18 further includes a plurality of holographic optical elements 26 provided within the see-through area 22. Each holographic optical element 26 is associated with one respective display segment 20. The holographic optical elements 26 are mutually spaced such that the see-through zone 24 is also provided between each pair of adjacent holographic optical elements 26. The see-through zone 24 is transparent and allows visible light to pass through the see-through member 18 between the display segments 20 and the holographic optical elements 26. This makes the display 14 locally transparent. Thus, an image of the physical world 12 can pass the see-through member 18 via the see-through zone 24.

As shown in FIGS. 2 and 3*b*, the holographic optical elements 26 are recorded directly in the see-through member 18. In particular, each holographic optical element 26 is a reflection hologram of a concave and parabolic mirror as shown in FIG. 4*c*, i.e. each holographic optical element 26 has magnifying optical properties.

As shown in FIGS. 4*b* and 4*c*, each display segment 20 is arranged on a side of the associated holographic optical element 26 facing towards the eye 16 and is located in a focal plane of the associated holographic optical element 26. Each holographic optical element 26 collimates the visible light emitted by the associated display segment 20 towards the eye 16.

As shown, for example, in FIG. 2, the plurality of display segments 20 and the plurality of holographic optical elements 26 are provided equidistantly along respective one-dimensional straight lines 28*a*, 28*b*, 28*c*, 28*d*. Further, the plurality of display segments 20 and the plurality of holographic optical elements 26 are provided in a rhombus-shaped manner across respective two-dimensional plane arrays spanned by the lines 28*a*, 28*b* and by the lines 28*c*, 28*d*, respectively. The arrays lie parallel to a surface of the see-through member 18.

As shown in the wavelength($\lambda$)-reflectivity(R)-diagram of FIG. 5, each holographic optical element 26 reflects visible light only within a deflection spectrum 30. The deflection spectrum 30 only covers a spectral section of the visible light spectrum 32. Further, each holographic optical element 26 is transparent for visible light within a transmission spectrum 34. The transmission spectrum 34 only covers a spectral section of the visible light spectrum 32 such that the deflection spectrum 30 and the transmission spectrum 34 do not overlap (i.e. are spectrally disjoint). Thus, visible light within the transmission spectrum 34 passes through the holographic optical element 26 without being refracted or reflected. The deflection spectrum 30 is a band spectrum including a red color $\lambda_r$, for example, around 630 nm. A bandwidth 36 (FWHM) of the band spectrum 30 is limited, for example, to around 30 nm.

As shown in FIG. 6, for each holographic optical element 26a, 26b a band pass filter 38 is provided. The band pass filter 38 is adapted to filter out visible light only within the deflection spectrum 30 and to transmit visible light within the transmission spectrum 34. The band pass filter is provided on a side of the holographic optical element 26 facing away from the eye 16, such that visible light of the physical world 12 within the deflection spectrum 32 is prevented from passing through the holographic optical element 26. This allows that visible light, which represents an image of the physical world 12 and whose color falls within the deflection spectrum 32 of the holographic optical element 26, does not perturb, disturb or pollute the superimposed image of the display 14 in the eye 16.

As shown in FIG. 5, each display segment 20 emits visible light only within an emission spectrum 40 including an emission band spectrum 40. The emission band spectrum 40 includes a red color $\lambda_r$, for example, around 630 nm. An emission bandwidth 42' (FWHM) of the emission band spectrum 40 is limited, for example, to around 30 nm or smaller. Therefore, the display segment 20 emits visible light only within the deflection spectrum 30 of the holographic optical element 26 associated with the display segment 20. Such a display segment allows for creating a mono-chromatic image.

As shown in FIGS. 7 and 8, each display segment 20 is formed of a plurality of mutually spaced pixel units 42. As a consequence, on a macroscopic scale the display 14 comprises a plurality of display segments 20, between which visible light can pass through via the see-through zones 24. On a microscopic scale, in turn, each display segment 20 itself may be regarded as a micro-display comprising a plurality of pixels units 42. This two-scale approach allows providing a transparent or at least semi-transparent display 14 with high resolution.

The plurality of pixels units 42 of each display segment 20 is provided in the focal plane of the holographic optical element 26 associated with the display segment 20. As shown in the example of FIG. 7, within the display segment 20 the plurality of pixels units 42 is provided equidistantly along straight one-dimensional pixel lines 44a, 44b. Further, within each display segment 20, the plurality of pixel units 42 is provided in rectangular-shaped or square-shaped manner across a two-dimensional plane pixel array spanned by the pixel lines 44a, 44b, see FIGS. 7 and 8. For example, along a one-dimensional pixel line, the number of the plurality of pixel units is 2 (FIGS. 2 and 8) or 4 (FIG. 7), wherein across the pixel array the number of the plurality of pixel units is 4 (FIGS. 2 and 8) or 16 (FIG. 7).

As shown in the example of FIG. 7, a pixel separation distance 48 between centers of adjacent pixel units 42 (also called pitch) is, for example, around 5 µm, whereas a pixel separation distance 50 between centers of the two pixel units 42 farthest apart in the display segment 20 is, for example, around 21 µm. A light emission surface of each pixel unit 42 is square-shaped or rectangular-shaped and, for example, around 25 µm². In FIGS. 7 and 8, the sizes of the display segments 20 are the same. The size of a display segment 20 is defined as the pixel separation distance 50 between the centers of the two pixel units 42 farthest apart in the display segment 20, see FIG. 7.

Each pixel unit 42 is, for example, an organic light emitting diode (OLED) or a micro-laser, see e.g. FIG. 8, for emitting visible light in a monochromatic emission spectrum. Alternatively, as shown in FIG. 9, a pixel unit 42 of a display segment 20 may comprise three sub-pixel units 52a, 52b, 52c, wherein the sub-pixel units 52a, 52b, 52c emit visible light of three different colors, namely red, green and blue. The sub-pixel units may be organic light emitting diodes (OLED) or a micro-laser, too, and are stacked substantially along a depth of field 54 of the holographic optical element 26 associated with the display segment 20, compare FIGS. 4c and 9.

As shown, for example, in FIGS. 3b, 4b, 6 and 9, each display segment 20 is provided with a mask 56' of material being opaque for visible light. The mask 56' is provided such that the display segment 20, 20a, 20b emits the visible light only towards the holographic optical element 26, 26a, 26b associated with the display segment 20, 20a, 20b. The mask 56' surrounds all the sides of the display segment 20, 20a, 20b despite the one side of the display segment 20, 20a, 20b that faces towards the associated holographic optical element 26, 26a, 26b.

As shown in FIGS. 6, 10, 11, 12, 14a and 14b, the holographic optical elements 26a, 26b are recorded and the associated display segments 20a, 20b are arranged relative to the holographic optical elements 26a, 26b such that an inclination angle β between a propagation direction 56a of visible light collimated by a holographic optical element 26a associated with a display segment 20a displaced by a displacement distance X from a center 58 of the plurality of display segments 20a, 20b and a propagation direction 56b of visible light collimated by a holographic optical element 26b associated with a display segment 20b placed at the center 58 of the plurality of display segments 20a, 20b increases with increasing displacement distance X in such a manner that the visible light collimated by each holographic optical element 26a, 26b passes through an exit pupil 60 of the see-through head or helmet mounted display device 10. The inclination angle β may be regarded as half the angle of view of the see-through head or helmet display device 10. Hence, all or most of the light power of the display 14 can be collimated into the user's eye 16, making the see-through head or helmet mounted display device 10 energy efficient.

To avoid a situation as shown in FIG. 11 or 14a, where the exit pupil 60 of the see-through head or helmet mounted display device 10 does not coincide with a pupil 62 of the user's eye 16, the see-through head or helmet display device 10 may comprise a frame 64, an actuator 66 for tilting the plurality of display segments 20a, 20b and the plurality of holographic optical elements 26a, 26b relative to the frame 64, an image capturing device 68 for capturing an image of the pupil 62 and for generating a position signal representing a position of the pupil 62, and a controller 70 for controlling the actuator 66 based on the position signal such that the position of the exit pupil 60 coincides with the position of the pupil 62, compare FIG. 12. As a consequence, all collimated light originating from the display segments 26a, 26b and leaving the see-through head or helmet display device 10 reaches the pupil 62 of the user's eye 16, even when the pupil 62 or the eye 16 is moving.

Additionally or alternatively, as shown in FIGS. 14a and 14b, the see-through head or helmet display device 10 may comprise a shifter 78 for shifting the plurality of display segments 20a, 20b relative to the plurality of holographic optical elements 26a, 26b along the focal planes of the holographic optical elements 26a, 26b, an image capturing device 68' for capturing an image of the pupil 62 and for generating a position signal representing a position of the pupil 62, and a controller 70' for controlling the shifter 78 based on the position signal such that the position of the exit pupil 60 coincides with the position of the pupil 62, compare FIG. 14b. As a consequence, all collimated light originating from the display segments 26a, 26b and leaving the see-through head or helmet display device 10 reaches the pupil 62 of the user's eye 16, even when the pupil 62 or the eye 16 is moving.

Additionally or alternatively, as shown in FIG. 13, the see-through head or helmet display device 10 may comprise a beam expander 72. The beam expander is provided on a side of the plurality of holographic optical segments 26a, 26b facing towards the user's eye 16 and on a side of the plurality of display segments 20a, 20b also facing towards the user's eye 16. The beam expander 72 consists of two holographic optical elements 74, 76 and expands the visible light collimated by all the holographic optical segments 26a, 26b. The size of these holographic optical elements 74, 76 is larger than the size of the display 14. This allows enlarging the profile of collimated beams leaving the see-through head or helmet display device 10 such that all the beams pass at least partially through the pupil 62 of the user's eye 16.

Unless expressly stated otherwise, identical reference symbols in the Figures stand for identical or identically-acting elements. Also, an arbitrary combination of the features and/or modifications elucidated in the Figures in connection with individual embodiments is conceivable.

The invention claimed is:

1. A see-through head or helmet mounted display device, comprising:
   a see-through member defining a see-through area and having rear and front sides, the rear side facing a user's eye when the see-through head or helmet mounted display device is worn by a user and the front side facing away from the user's eye when the see-through head or helmet mounted display device is worn by the user;
   a plurality of display segments arranged on the see-through member in the see-through area wherein the plurality of display segments is configured to emit either monochromatic visible light or polychromatic visible light but not both;
   a plurality of holographic optical elements arranged on the see-through member in the see-through area, wherein each holographic optical element is arranged in front of a respective one of the plurality of display segments,
   wherein each display segment is located in a focal plane of its associated holographic optical element and is adapted to emit visible light towards the associated holographic optical element,
   wherein the plurality of display segments are arranged in a mutually spaced manner to define a see-through zone extending between each pair of adjacent display segments, the see-through zone allowing ambient light to pass therethrough,
   wherein each holographic optical element is adapted to reflect visible light emitted by the associated display segment towards the rear side of the see-through member,
   wherein, when the plurality of display segments emit monochromatic visible light, the plurality of display segments each include a plurality of mutually spaced monochromatic pixel units, each pixel unit defining a pixel of an image, and, when the plurality of display segments emit polychromatic visible light, the plurality of display segments each include a plurality of mutually space polychromatic pixel units, each pixel unit defining a pixel of an image and including a plurality of sub-pixel units each configured to emit visible light of a respective different color, and
   wherein an interspace between adjacent display segments is larger than an interspace between adjacent pixel units of a display segment.

2. The see-through head or helmet mounted display device according to claim 1, wherein each holographic optical element is adapted to reflect visible light within a reflection spectrum and transmit visible light within a transmission spectrum, wherein the reflection spectrum and the transmission spectrum are spectrally disjoint.

3. The see-through head or helmet mounted display device according to claim 2,
   wherein the reflection spectrum is a wavelength band having a bandwidth of not more than about 30 nm.

4. The see-through head or helmet mounted display device according to claim 2,
   wherein, when the plurality of display segments emits polychromatic visible light, the reflection spectrum includes a red wavelength band, a green wavelength band and a blue wavelength band, at least one of the red, green and blue wavelength bands having a bandwidth of not more than about 30 nm.

5. The see-through head or helmet mounted display device according to claim 2, including a filter member arranged on the see-through member in front of each holographic optical element, wherein the filter member is designed as a band pass filter adapted to filter out visible light within the reflection spectrum and transmit visible light within the transmission spectrum.

6. The see-through head or helmet mounted display device according to claim 2,
   wherein each display segment is adapted to emit light only within the reflection spectrum.

7. The see-through head or helmet mounted display device according to claim 1, including a mask arranged on the see-through member at a rear side of each display segment, wherein the mask is made of a material that is opaque or reflective for the light emitted by the display segment.

8. The see-through head or helmet mounted display device according to claim 1,
   wherein a holographic optical element associated with a center-located display segment among the plurality of display segments reflects a collimated beam of light having a first beam propagation direction towards the rear side of the see-through member and a holographic optical element associated with an off-centered display segment among the plurality of display segments reflects a collimated beam of light having a second beam propagation direction towards the rear side of the see-through member, wherein an angle between the first and second beam propagation directions increases as a distance of the off-centered from the center-located display segment increases.

9. The see-through head or helmet mounted display device according to claim 1 further comprising:
   a frame;
   an actuator adapted to tilt the plurality of display segments and the plurality of holographic optical elements relative to the frame;
   an image capturing device adapted to capture an image of a pupil of a user's eye and generate a signal indicative of a position of the pupil; and
   a controller adapted to control the actuator based on the signal.

10. The see-through head or helmet mounted display device according to claim 1, further comprising:
   a shifter adapted to shift the plurality of display segments relative to the plurality of holographic optical elements;
   an image capturing device adapted to capture an image of a pupil of a user's eye and generate signal indicative of a position of the pupil; and
   a controller adapted to control the shifter based on the signal.

11. The see-through head or helmet mounted display device according to claim 1, comprising:
   a beam expander arranged at a rear side of the plurality of display segments and adapted to expand visible light reflected from the holographic optical elements.

12. The see-through head or helmet mounted display device according to claim 1, wherein the plurality of display segments are arranged on the see-through member in a two-dimensional distribution pattern.

13. The see-through head or helmet mounted display device according to claim 1, wherein the plurality of display segments each include a plurality of four or more pixel units, wherein an interspace between adjacent display segments is larger than an interspace between adjacent pixel units of a display segment.

14. The see-through head or helmet mounted display device according to claim 1, wherein the plurality of display segments each include a plurality of pixel units arranged in a row and column pattern, wherein an interspace between adjacent display segments is larger than an interspace between adjacent pixel units of a display segment.

15. The see-through head or helmet mounted display device according to claim 14, wherein the number of pixel units is $2^n$ in each display segment, wherein n is an integer equal or larger than 2.

16. The see-through head or helmet mounted display device according to claim 1, wherein when the plurality of display segments emit polychromatic visible light, the plurality of display segments each include a plurality of pixel units, each pixel unit including a plurality of sub-pixel units configured to emit light of different colors.

17. The see-through head or helmet mounted display device according to claim 1, wherein each holographic optical element is effective as a parabolic mirror.

18. The see-through head or helmet mounted display device according to claim 1, wherein the plurality of holographic optical elements are arranged in a mutually spaced manner, so that the see-through zone is also defined between each pair of adjacent holographic optical elements.

* * * * *